US006829521B2

(12) United States Patent
Graushar et al.

(10) Patent No.: US 6,829,521 B2
(45) Date of Patent: Dec. 7, 2004

(54) PRINTED PRODUCTS

(75) Inventors: William T. Graushar, Elm Grove, WI (US); John C. Geres, West Allis, WI (US); Edward J. Anderson, Hartland, WI (US)

(73) Assignee: Quad/Graphics, Inc., Sussex, WI (US)

( * ) Notice: Subject to any disclaimer, the term of this patent is extended or adjusted under 35 U.S.C. 154(b) by 0 days.

(21) Appl. No.: 10/747,750

(22) Filed: Dec. 29, 2003

(65) Prior Publication Data

US 2004/0143365 A1 Jul. 22, 2004

Related U.S. Application Data

(63) Continuation of application No. 10/062,124, filed on Jan. 31, 2002, now Pat. No. 6,675,062.

(51) Int. Cl.[7] .................................................. G06F 7/00
(52) U.S. Cl. ........................ 700/225; 700/219; 700/223
(58) Field of Search ................................ 700/213, 219, 700/221, 223, 224, 225, 226; 414/795.9, 790.8, 789.9

(56) References Cited

U.S. PATENT DOCUMENTS 3,839,636 A 10/1974 Worrall
4,141,492 A 2/1979 Michel et al.
4,541,763 A 9/1985 Chandhoke et al.
4,750,132 A 6/1988 Pessina et al.
5,092,829 A 3/1992 Gerber
5,138,817 A 8/1992 Mowry et al.
5,174,454 A 12/1992 Parkander
5,338,149 A 8/1994 Wiseman
5,383,130 A 1/1995 Kalisiak
5,458,323 A 10/1995 Magee et al.
5,505,585 A 4/1996 Hubbard
5,613,669 A 3/1997 Grueninger
5,772,391 A 6/1998 Sjogren et al.
5,918,879 A 7/1999 Steinhilber
6,192,295 B1 2/2001 Gunther
6,259,369 B1 7/2001 Monico
6,400,272 B1 6/2002 Holtzman et al.
6,519,503 B2 2/2003 Paterson et al.

*Primary Examiner*—Gene O. Crawford
(74) *Attorney, Agent, or Firm*—Michael Best & Friedrich LLP

(57) ABSTRACT

A log of printed products having thereon an identification that is programmable and then readable to access information regarding the printed products that make up the log such as product identification, orientation and destination, the printed products including either bound and non-bound printed products.

29 Claims, 6 Drawing Sheets

PRINTED PRODUCTS

RELATED APPLICATIONS

This application is a continuation of application Ser. No. 10/062,124, filed Jan. 31, 2002 now U.S. Pat. No. 6,675,062.

FIELD OF THE INVENTION

The invention relates to logs of printed products having thereon a programmable identification which is accessible to provide product information such as product identification and orientation, and relates to methods for producing such logs and methods for utilizing such logs.

BACKGROUND OF THE INVENTION

As used in the printing industry, a log is a stack of typically unbound printed products such as signatures that are contained on each end of the stack with an end board. The signatures and end boards are then strapped to create a unified structure that can be transported with a device such as a forklift or crane. Such a log makes transporting quantities of signatures more efficient. In use, the logs are transported to and loaded onto a log loader of a binding line where the log is unstrapped and end boards removed. The signatures are then feedable to the binding line.

When transporting and loading a log onto a log loader of a binding line, errors can occurs such as the log of signature being delivered to the wrong log loader or such as the log of signatures being loaded onto the log loader in an incorrect orientation. Different types and models of log loaders require different signature orientations, i.e., spine leading, lap leading, etc.

SUMMARY OF THE INVENTION

The invention provides a log of printed products which include thereon a programmable identification that is readable to provide information regarding the printed products that compose the log. The information readable from the log ensures that further processing of the log is conducted without errors or is conducted more efficiently.

In one embodiment of the invention, the log is composed of unbound printed products such as signatures. When the log of signatures is created, the programmable identification is programmed to include information such as signature identification and orientation. When needed, the log is transported to a binding line and loaded onto a log loader by a lifting device such as a crane and bundle clamp. One or both of the bundle clamp and log loader have a reader thereon to read the identification on the log. The accessed information eliminates errors by ensuring that the log is loaded onto the correct log loader and loaded in the correct orientation.

In another embodiment of the invention, the log is composed of bound printed products such as magazine, catalogs, books, direct mail pieces, or the like. The log has thereon a programmable identification which is readable to provide information regarding the contents of the log such as product type, orientation, postal destination, end of pallet, or the like. The identification is readable during subsequent transporting or processing of the log to reduce handling errors and increase processing efficiency.

The invention includes methods for producing logs of printed products having thereon a programmable identification containing readable information relating to the printed products that compose the log as well as methods for utilizing or further processing such logs. In particular, the invention also includes a method for forming a log of bound printed products.

Other features and advantages of the invention will become apparent to those of ordinary skill in the art upon review of the following detailed description, claims, and drawings.

Figure 1:
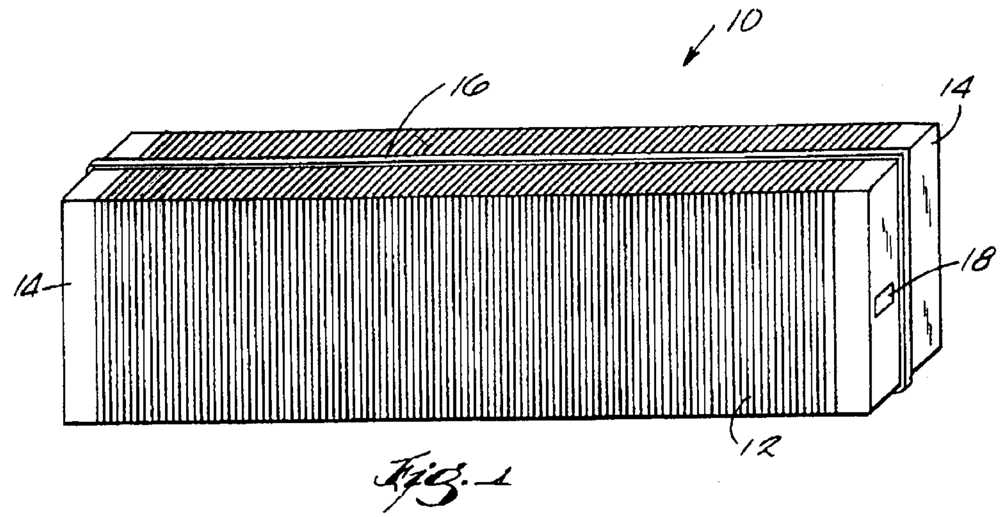
FIG. 1 is a perspective view of a log of signatures.

Before one embodiment of the invention is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

Referring now to the drawings, there is shown in FIG. 1 a printed product assembly or log 10 of printed products. The log 10 includes printed products such as the signatures 12 shown in FIG. 1 stacked one adjacent the other. The logs 10 can be of varying sizes and other orientations such as U or L shaped in correspondingly configured enclosures. For example, log 10 can range from 36–50 inches in length. Optionally, on each end of the stack of signatures is an end board 14. It should be noted however that the present invention can be implemented without the use of end boards. The end boards 14 are typically dimensioned to be approximately the same size as the signatures 12 but can be of other varying sizes. The end boards 14 can be fabricated of materials such as paper, wood or plastic. A fastener such as strap 16 is wrapped around the signatures 12 and end boards 14 to enable the log 10 to be moved as a unitary piece without falling apart.

The invention includes the use of a programmable identification 18 in conjunction with the log 10. The identification 18 preferably is positioned within one or both of the end boards 14 and can take the form of an embedded microchip, a RF tag or similar programmable technology such as electronic, magnetic, optical or computer related technologies. For example, RF tag technology is available from Motorola. Preferably, the identification 18 is adhered to one of the end boards 14 such as with an adhesive. However, it should be noted that other attachment or securing methods can also be employed to associate the identification 18 to the end board 14. If end boards are not used, the identification 18 can be placed on the stacked signature(s) such as with a RF tag or magnetic ink printed on one or more signatures such as on the lap of a signature.

The identification 18 is intended to make the log 10 a "smart log" and thus eliminate errors when transporting and using the logs in the binding process, errors such as in loading the wrong signature or a signature in the wrong orientation onto a loader of a binding line.

Figure 2:
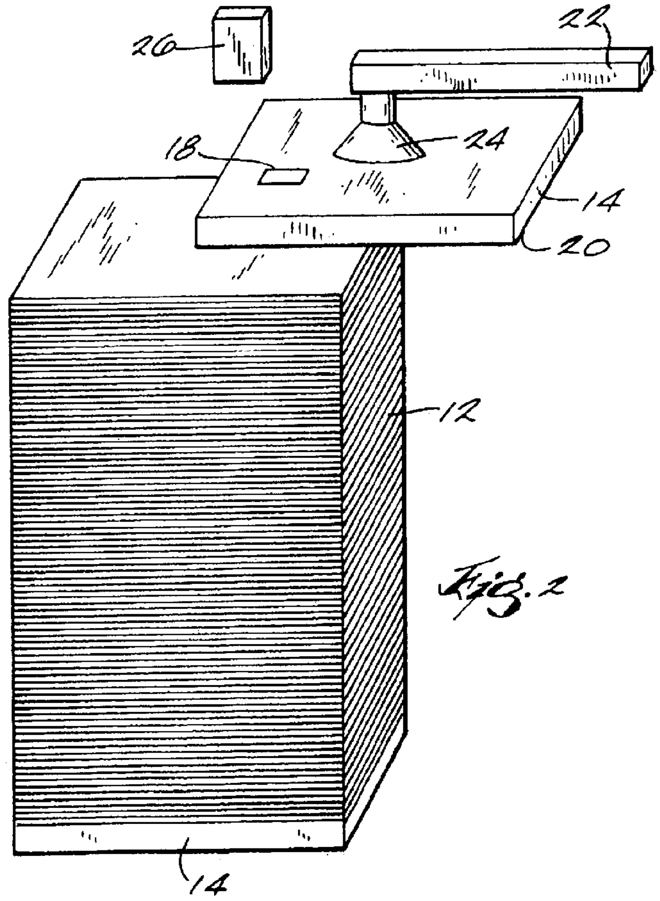
FIG. 2 is a perspective view of a log of signatures being created.

With reference to FIG. 2, a log 10 is conventionally created on press with the use of a stacker 20 (a portion of which is shown in FIG. 2), also called a bundler or stacker/bundler, to make logs of a given length dimension. On a conventional stacker 20 such as model 3600 available from QTI of Sussex, Wis., an arm 22 having a suction cup 24 puts down the lower most end board 14 before the stack of signatures 12 is created then positions the uppermost end board 14 after the stack is created. At some point before, during or after creation of the stack, the identification 18 is appropriately programmed by programmer 26, for example. The information programmed or embedded onto the identification 18 preferably includes signature identification (what form has been bundled), log orientation (where the backbone is and the direction of the high/low folio), and log position on a pallet. Any other information could be programmed or embedded as well. After a log 10 is created and the identification 18 programmed, the log 10 is typically piled via crane/hoist onto a pallet and stored until needed at a binding line or other processing destination.

Figure 3:
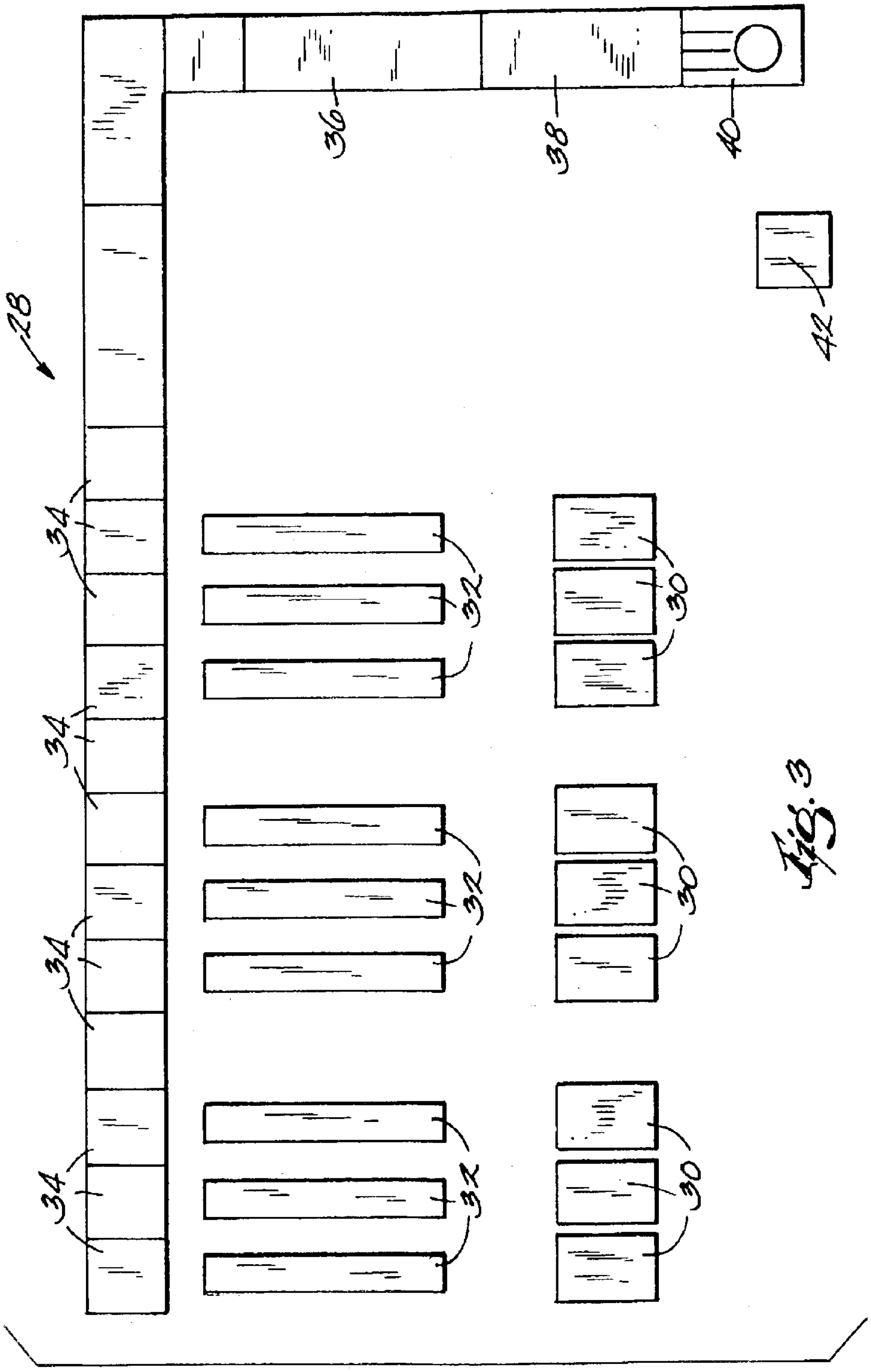
FIG. 3 is a schematic of a typical saddle stitcher binding line.

Turning now to FIG. 3, a typical saddle stitcher binding line 28 is shown. It should be noted that the invention is capable of being used with other configurations and types of binding lines and capable of being used in other processing in other destination in addition to bindery lines. The binding line 28 includes generally the following conventional components: pallets 30 for the logs 10, log loaders 32, pockets 34, a trimmer 36, a mail table 38, a stacker 40 and a controller 42. It should also be noted that more or less than the nine log loaders 32 shown in FIG. 3 can be utilized depending upon the specifics of a given binding job.

Before a binding job is begun, information regarding the job is downloaded into the controller 42. Pocket assignments for each signature are inputted into the controller 42; i.e., which pockets will be feeding which signatures, and inputs the log loader type to be used for each signature.

Different types and models of log loaders 32, also called feeders, require different signature orientations; i.e. spine leading, lap leading, etc. Associated with each log loader 32 is a pallet 30 for the logs 10 that are to be loaded onto a particular log loader 32. Logs 10 that correspond to a given pocket/log loader 32 are transported such as by a forklift from a storage location onto a pallet 30 and positioned adjacent a respective log loader 32. A hoist such as a conventional crane system provided with a bundle clamp is preferably utilized to transfer logs 10 from the pallet 30 to the corresponding log loader 32.

Figure 4:
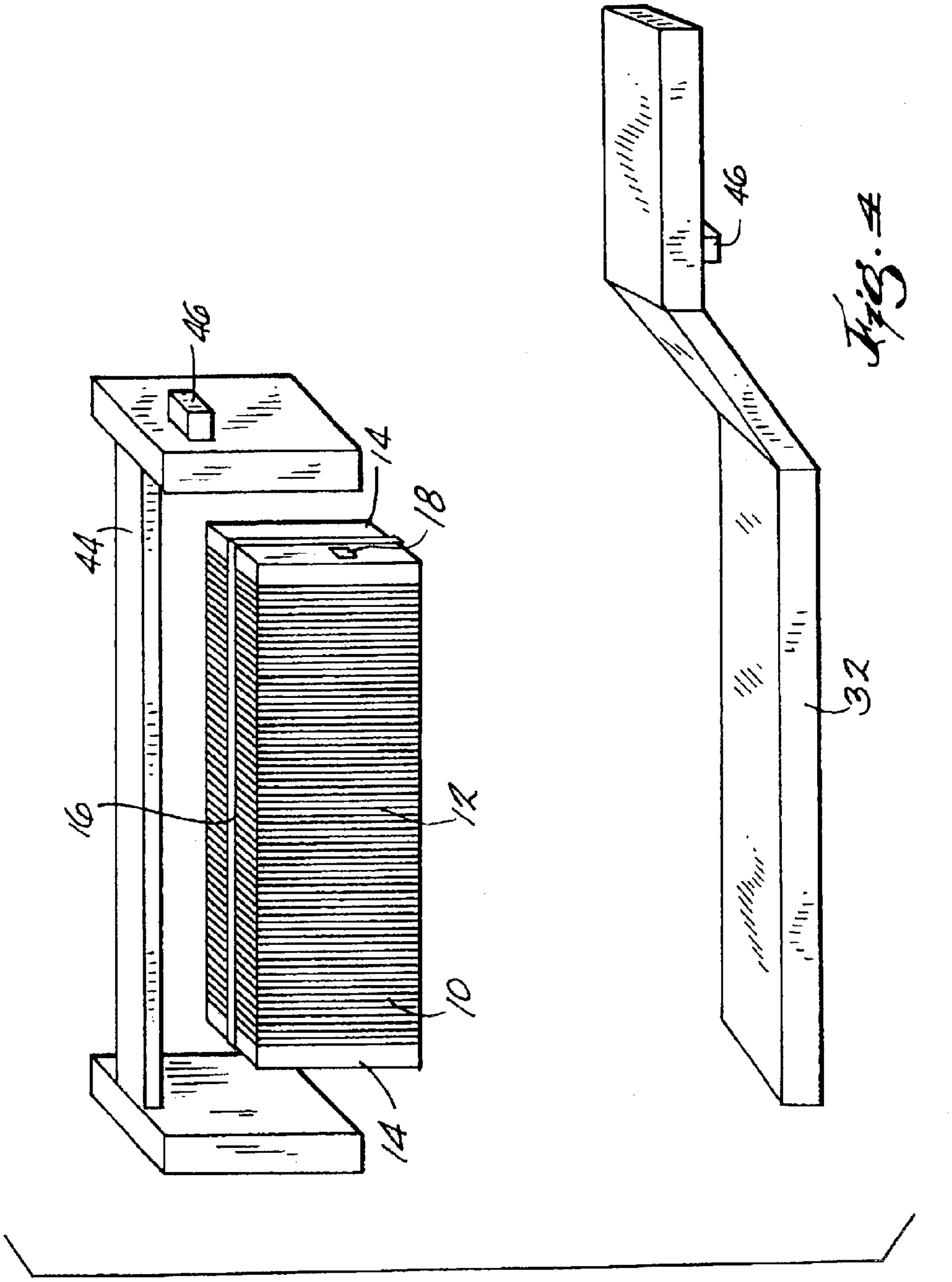
FIG. 4 is a perspective view of a bundle clamp loading a log loader.
Figure 5:
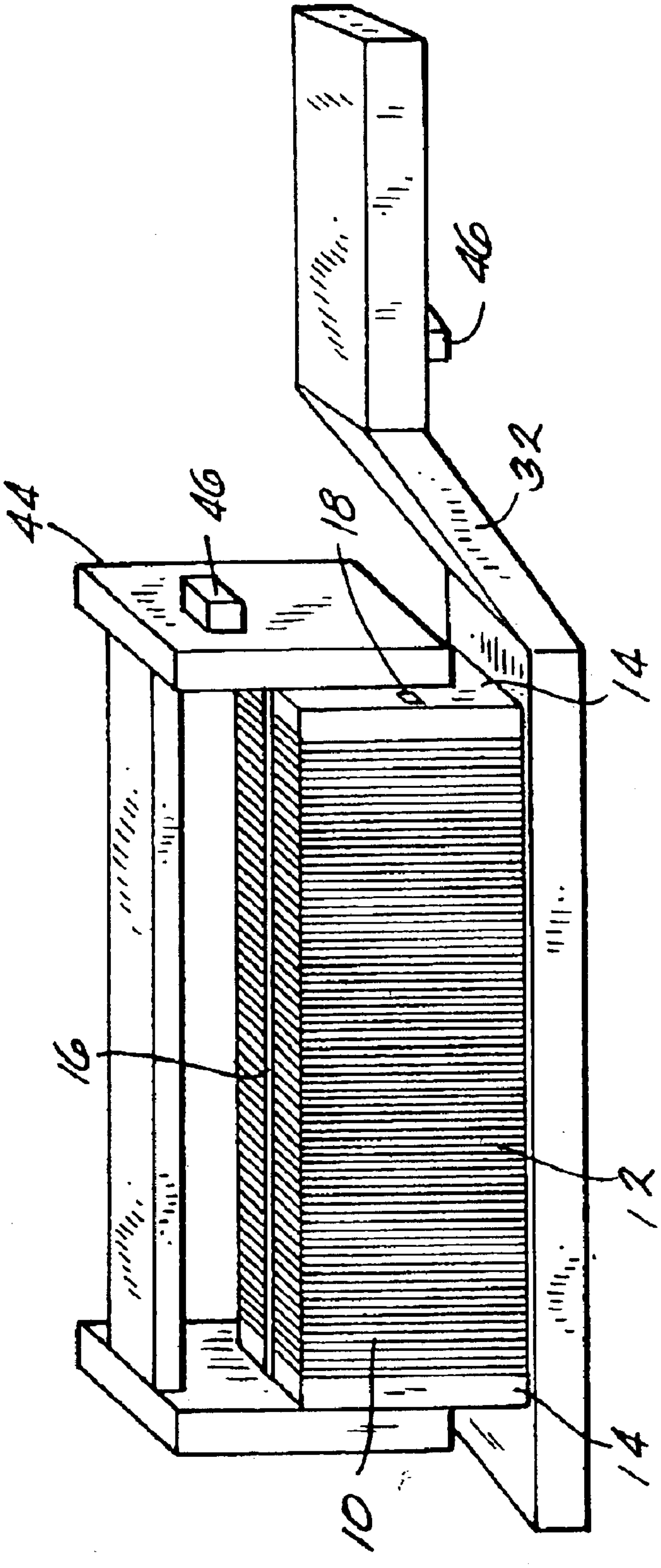
FIG. 5 is a perspective view of the bundle clamp loading the log loader.

Turning now to FIGS. 4 and 5, it is imperative that the correct signatures 12 in the correct orientation are loaded onto a particular log loader 32. To this end, the identification 18 on each log 10 is utilized to eliminate handling errors. Preferably, the bundle clamp 44 and the log loader 32 each include a reader 46 or scanner to read the data from the identification 18 on each log 10. The position of the reader 46 on the bundle clamp 44 or log loader 32 can vary. Both the bundle clamp 44 and the log loader 32 are in communication with the controller 42 and can be in communication with each other. It should be noted that the reader 46 could be located only on the bundle clamp 44 or only on the log loader 32 instead of in both locations.

Typically, log loaders hold approximately two and one half logs of signatures. When a log 10 needs to be loaded onto a log loader 32, the bundle clamp 44 picks up the log 10. The reader 46 on the bundle clamp 44 reads the information from the identification 18. The information is sent to the controller 42 for verification that the proper signatures 12 are being loaded onto a particular log loader 32 that corresponds to a particular pocket 34. The information is also used to ensure that the bundle clamp 44 rotates and orients the signatures 12 properly with respect to the log loader 32; i.e., lap leading and spine down. It should also be noted that the bundle clamp 44 could read the identification 18 from the log 10 before the bundle clamp 44 picks up the log 10.

A crane (not shown) then moves the bundle clamp 44 with log 10 held therein to a particular log loader 32 and orients the log 10 in response to the information it obtained from the identification 18 on the log 10. Before the bundle clamp 44 can release the log 10 onto the log loader 32, the reader 46 on the log loader 32 reads the information from the identification 18. The information is sent to and analyzed by the controller 42. From a look-up table, the controller 42 knows the proper orientation and signature identification required for each log loader 32. If the analyzed information does not match what the controller 42 is programmed to accept, the bundle clamp 44 is not permitted to open or release the log 10. A technician is alerted as to the problem such as with an audible alarm or on a display.

If the analyzed information matches what the controller 42 is programmed to accept, the bundle clamp 44 is permitted to open and the log 10 is released onto the log loader 32. A technician then removes the strap 16 and removes the end boards 14 and the signatures 12 proceed conventionally into the respective pocket 34. The end boards 14 can then be reused in the formation of another log 10 and thus reprogrammed when a new log 10 is created. Optionally, the end boards 14 with identification 18 thereon could be discarded.

The above described embodiment of the invention involves a log 10 comprised of printed products that were individual conventional signatures 12. A second embodiment of the invention is illustrated in FIGS. 6 and 7.

Figure 6:
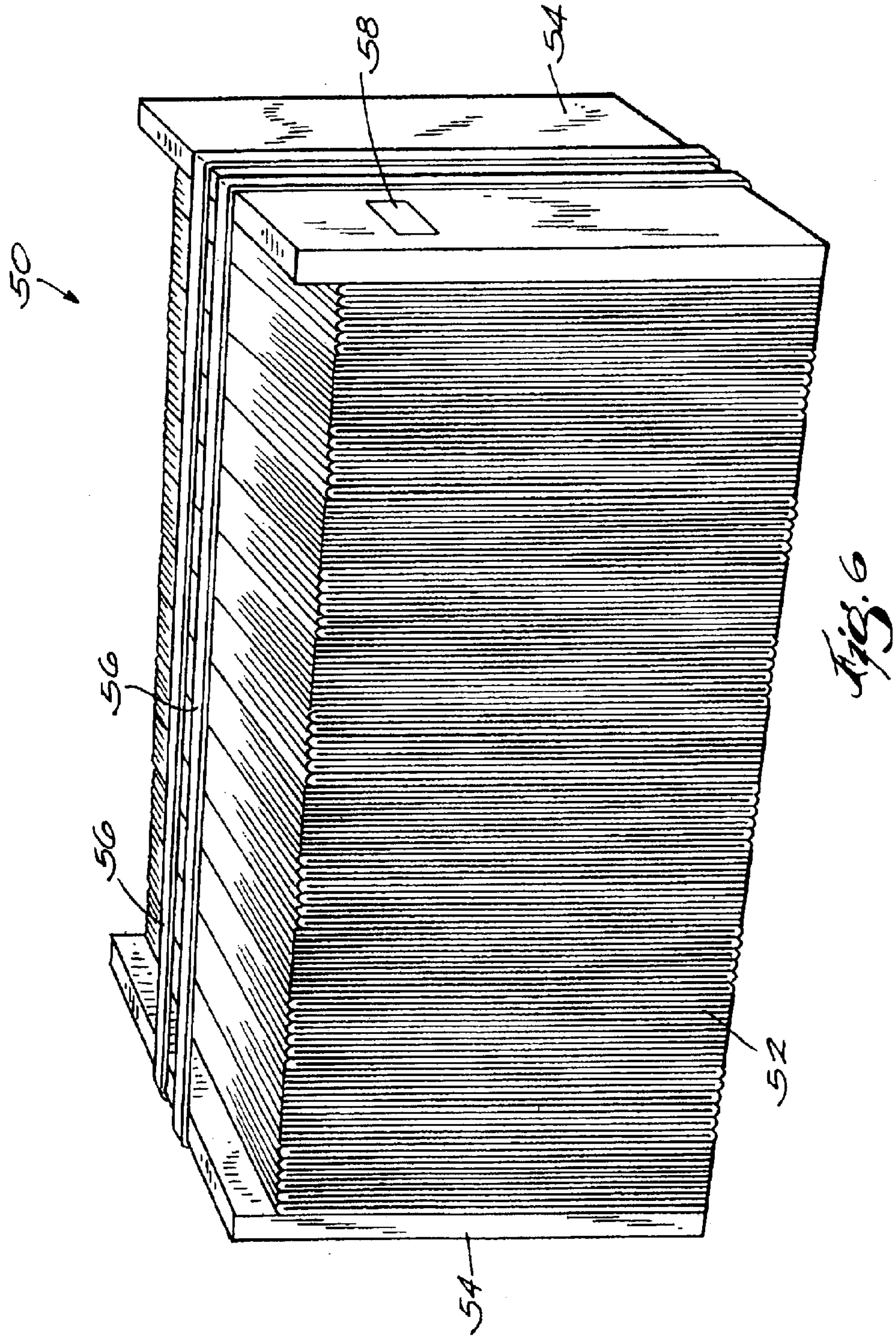
FIG. 6 is a perspective view of a log of bound printed products.
Figure 7:
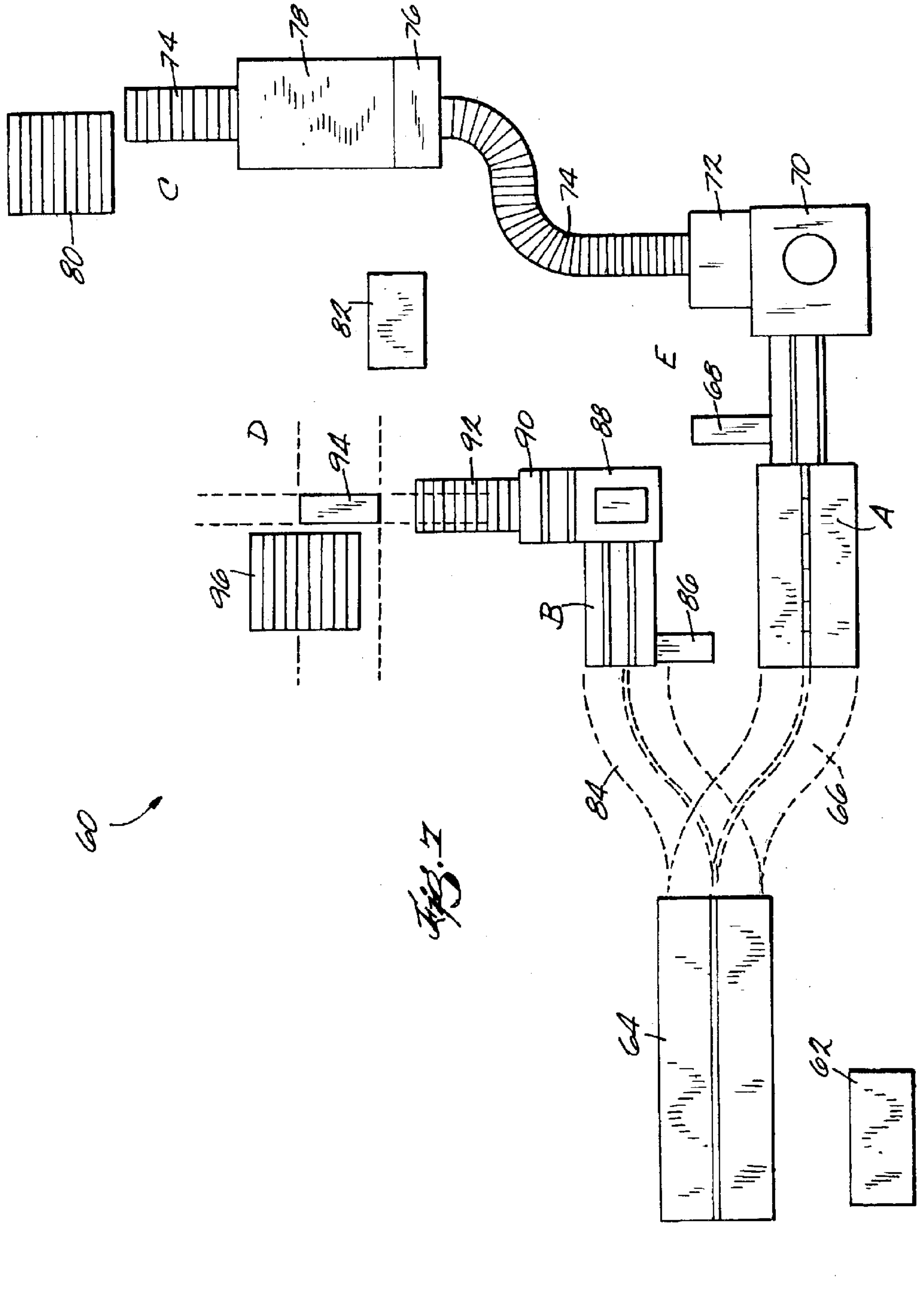
FIG. 7 is a schematic of a portion of a binding line.

With reference to FIG. 6, a log 50 is shown that is comprised of already bound printed products 52, also called books, such as magazines, catalogs, direct mail pieces, or the like stacked one adjacent the other. On each end of the stack of bound printed products is an end board 54. The end boards 54 are preferably dimensioned to be approximately the same size as the bound printed products 52 and are fabricated of materials such as paper, wood or plastic. Straps 56 are wrapped around the printed products 52 and end boards 54 to enable the log 50 to be moved in one piece without falling apart.

To create a log 50 of bound printed products 52, a stacker (not shown) also called a bundler or stacker/bundler, is employed such as model 3600 available from QTI of Sussex, Wis. After the log 50 is created, an identification 58 is appropriately programmed as explained above with respect to the first embodiment. The information programmed or embedded onto the identification 58 preferably includes product identification and distribution information such as subscriber information, postal destination end of pallet and sequence. Any other information could be programmed or embedded as well.

The information associated with each log 50 can then be utilized when moving the log 50 to a pallet to ensure that the log 50 is being transported to the proper location. The transportation device utilized to move the log 50 has thereon a suitable reader 46 to read the information from the identification 58 on the log 50 to ensure that no transportation errors occur.

The information associated with the log can also be utilized by a distribution or mailing center. For example, the U.S. Postal Service (USPS) could be provided with a reader 46. Upon arrival or upon loading into sorting equipment by a crane, the reader 46 would read the identification 58 for a given log 50 and gain information about that log 50 such as the type of product, number of products in the log, products' ultimate destinations, postal fee information, etc. The read information could be used to increase the efficiency of the delivery system by enabling increased automation and less handling errors.

Turning now to FIG. 7 in particular, a portion of a binding line 60 is shown and a second method for forming the logs 50 of bound printed product 52 is illustrated. The printed products 52 are bound in the usual bindery fashion in conjunction with a controller 62. After the products 52 complete the assembly process, they are conveyed on a mail table 64 towards equipment used to prepare the products for shipment to the USPS or any other destination. In the usual fashion, the products 52 are bundled following USPS specifications. That is, bundled packages of products 52 (strapped, shrink wrapped or combinations thereof) are made for carrier route, 5-digit, 3-digit, etc. and piled on a pallet. The height and weight of these bundles are limited by USPS specifications and typical bindery equipment.

Lane A of FIG. 7 utilizes equipment and a method of preparing traditional bundles of bound printed product 52. The conventional equipment includes the following: a directional conveyor 66, a reject conveyor 68, a bundle stacker 70, a bundle strapper 72, bundle conveyors 74, a bundle wrapper 76, a heat tunnel 78 and a bundle pallet 80. This equipment is typically used in the bindery to prepare bound printed products 52 for shipment. A hand strapper 82 is also shown that is used as a back-up method of securing bundles if any failures occur during the packaging process. Products 52 come off the mail table 64 into Lane A, bundles of products 52 are strapped and wrapped, transported through a heat tunnel 78 then conveyed via the bundle conveyor 74 to a pallet 80. Bundles sizes vary depending upon the number of pieces for a particular postal sort.

Lane B of FIG. 7 utilizes equipment and a method of preparing the bound printed products 52 in logs 50, which is a more effective way of handling quantities of product 52. The equipment utilized includes: a directional conveyor 84, a reject conveyor 86, a log stacker 88, a log strapper 90, a log conveyor 92, a log crane 94, and a log pallet 96.

As shown in FIG. 7, workers for performing certain tasks are positioned at locations C, D and E. At location C, a worker piles product onto the pallet 80 if that product was produced in the traditional method of bundling. At location D, a worker operates the log crane 94. At location E, a worker collects recalled printed products that are required to be loaded into a working pallet. Recalls are magazines that are re-manufactured for rejected products (missing pages, bad trim, missing staples, etc.). Because of the manufacturing process, these products cannot be produced before the log or bundle changes from one sort to the next unless generic books are used. The recalled magazines (if they do not get into the proper log or bundle) are removed from the binding line 60 onto the conveyors 68 and 86. The worker collects these products 52 and places them into the required log or onto the required pallet.

In operation, as the assembled printed products 52 are conveyed on the mail table 64, a controller 62 decides which Lane, A or B, the printed products 52 will be directed to. Typically, carrier route sort products 52 would be directed to Lane A because the products 52 for carrier routes justify a traditional bundle.

Because any mailed pieces (other than a carrier route package) need to be sorted by the USPS or like entity, an effective way to present product to the sorting system is in the form of a log 50. A log 50 of product 52 presents more pieces to the sorting system in the same amount of time than numerous bundles of product, which are currently lifted one, or a few at a time, by USPS personnel. Further, a log 50 of product 52 typically has less waste material that a series of bundles. A log 50 utilizes fewer straps 56, whereas the amount of bundles equaling the products 52 held in one log 50 would produce many more straps as well as wrapping material. Consequently, because more pieces are delivered to a sorter in the same amount of time, and less waste material required for the same amount of product, a log 50 of product 52 is more efficient than a traditional bundle.

An example of the usage of Lane B is as follows. If 700 pounds of magazines are to be manufactured for a 5-digit postal destination and each magazine weighs ⅕ of a pound, then 3500 magazines will be produced for this 5-digit pallet. If each magazine is ⅕ of an inch thick, then 700 inches of magazines need to be fitted onto a pallet. To optimally fit a typical pallet, which is approximately 47 inches by 40 inches, logs 50 would be created in approximately 46 inch lengths. As the magazines proceed on the directional conveyor 84 into the log stacker 88, the controller 62 preferably, although not necessarily, monitors the process. When 46 inches of magazines have been stacked, the log 50 is delivered to the log strapper 90 where it is strapped. Without interruption, and while one log 50 is being strapped, another log 50 can be formed in the log stacker 88. The strapped log 50 is conveyed towards a crane 94 where it is picked up and then placed on the pallet 96. After fourteen logs 50 have been created at 644 inches, approximately 56 inches of product remain to be produced. The controller 62 or stacker can either create another log of 46 inches and then a 10 inch log, or split the remaining 56 inches of product into equal lengths (28 inch logs) or any combination thereof. Monitoring the process of sorting the bound printed products 52 is well known in the industry, and therefore, knowing where one bundle, log or pallet ends and the next begins, is commonly executed in many binderies. The end of bundle/log/pallet information could be data included in the programmable identification 18. Such information could be used to help ensure bundle/log/pallet integrity. Sounding a horn or illuminating a light when a pallet is complete could be an aid for any technician working this area. Sorting the printed products 52 either in logs 50 or bundles poses no difficulties for the controller 62. It should be noted that bundles of any size or length could be made at any time.

When the above described 5-digit pallet of magazines is completed, the next pallet is begun. If the next pallet is anything except a carrier route pallet, it is directed into Lane B. If the next sequence of production is a carrier route pallet, it would be directed into Lane A where bundles of magazines would be produced.

When creating the logs 50 in Lane B, the end boards 54 are placed on each end of the stack that is to form the log 50 at the log stacker 88. Optionally, an identification 58 as described above for that log 50 can be programmed. Further, when creating logs 50 of bound printed product 52, it may be necessary to compensate the products during the stacking process. Because bound printed products are sometimes thicker near the backbone, compensating them will offset this bulkier dimension and create a straighter more manageable log 50. For example, FIG. 6 shows a log of compensated magazines wherein after every ten magazines, the next ten are turned 180°.

We claim:

1. An assembly comprising:

a plurality of bound books;

an end board adjacent the plurality of bound books; and an electronic ID secured to the end board, the ID being readable to obtain information regarding the books.

2. The assembly as set forth in claim 1 wherein the electronic ID includes at least one of a microchip and RF technology.

3. An assembly comprising:

a plurality of signatures;

an end board adjacent the plurality of signatures; and an electronic ID secured to the end board, the ID being readable to obtain information regarding the signatures.

4. The assembly as set forth in claim 3 wherein the electronic ID includes at least one of a microchip and RF technology.

5. An assembly comprising:

a plurality of constrained printed products; and an electronic ID coupled to the plurality of constrained printed products and being readable while coupled to the printed products to obtain information regarding the printed products.

6. The assembly as set forth in claim 5 wherein the printed products are constrained using a fastener including at least one of an end board, a strap and a container.

7. The assembly as set forth in claim 5 wherein the ID is secured to the fastener.

8. The assembly as set forth in claim 5 wherein the printed products include at least one of signatures and books.

9. A method of processing printed products comprising:

creating an assembly of printed products;

programming an electronic ID with information relating to the printed products;

coupling the ID to the assembly;

transporting the assembly to a destination for processing; and reading the ID.

10. The method of claim 9 and further including the step of handling the assembly in response to the information read from the ID.

11. The method of claim 9 wherein the printed products include at least one of signatures and bound books.

12. A method of processing printed products comprising:

creating an assembly of constrained printed products;

programming an electronic ID with information relating to the printed products;

coupling the ID to the assembly, the ID being readable while coupled to the assembly;

transporting the assembly to a destination for processing; and reading the ID.

13. The method of claim 12 and further including the step of handling the assembly in response to the information read from the ID.

14. A method of processing printed product comprising:

reading an electronic ID that is coupled to an assembly of printed products; and transporting the assembly to a destination for processing.

15. The method of claim 14 wherein the printed products include at least one of signatures and bound books.

16. A method of processing printed products comprising:

creating an assembly of printed products;

coupling an electronic ID to the assembly;

transporting the assembly to a destination for processing; and reading the ID while it is coupled to the assembly to obtain information regarding the printed products.

17. The method of claim 16 and further including the step programming the electronic ID with the information relating to the printed products.

18. A method of processing printed products comprising:

coupling an electronic ID to an assembly of printed products;

transporting the assembly to a destination for processing; and reading the ID while coupled to the assembly to obtain information about the printed products.

19. A method of processing printed products comprising:

creating an assembly of printed products;

programming an electronic ID with information relating to the printed products; and coupling the ID to the assembly so as to be readable while so coupled.

20. A method of creating an assembly of printed products comprising:

associating a plurality of printed products with one another;

programming an electronic ID with information relating to the printed products; and associating the ID with the printed products so as to be readable in situ.

21. An assembly comprising:

a plurality of bound books;

an end board adjacent the plurality of bound books; and an electronic ID secured to the end board.

22. An assembly comprising:

a plurality of signatures;

an end board adjacent the plurality of signatures; and an electronic ID secured to the end board.

23. An assembly comprising:

a plurality of constrained printed products; and an electronic ID coupled to the plurality of constrained printed products and being readable while coupled to the printed products.

24. A method of processing printed products comprising:

creating an assembly of printed products;

providing an electronic ID programmed with information;

coupling the ID to the assembly;

transporting the assembly to a destination for processing; and obtaining the information from the ID.

25. A method of processing printed products comprising:

creating an assembly of constrained printed products;

programming an electronic ID with information;

coupling the ID to the assembly, the ID being readable while coupled to the assembly;

transporting the assembly to a destination for processing; and obtaining the information from the ID.

26. A method of processing printed products comprising:

creating an assembly of printed products;

coupling an electronic ID to the assembly;

transporting the assembly to a destination for processing; and obtaining the information from the ID while the ID is coupled to the assembly.

27. A method of processing printed products comprising:

coupling an electronic ID to an assembly of printed products;

transporting the assembly to a destination for processing; and obtaining information from the ID while the ID is coupled to the assembly.

28. A method of processing printed products comprising:

creating an assembly of printed products;

programming an electronic ID with information; and coupling the ID to the assembly so that the information is obtainable while so coupled.

29. A method of creating an assembly of printed products comprising:

associating a plurality of printed products with one another;

programming an electronic ID with information; and associating the ID with the printed products so as to be readable in situ.

* * * * *